(12) United States Patent
Matsuda

(10) Patent No.: US 8,792,122 B2
(45) Date of Patent: Jul. 29, 2014

(54) IMAGE FORMING APPARATUS, METHOD FOR CONTROLLING IMAGE FORMING APPARATUS, AND STORAGE MEDIUM

(75) Inventor: Hiroshi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/370,566

(22) Filed: Feb. 10, 2012

(65) Prior Publication Data
US 2012/0212782 A1 Aug. 23, 2012

(30) Foreign Application Priority Data

Feb. 22, 2011 (JP) ................................ 2011-036058

(51) Int. Cl.
*G06F 3/12* (2006.01)
*G06K 15/00* (2006.01)

(52) U.S. Cl.
USPC .......... 358/1.15; 358/1.1; 358/1.17; 358/1.18

(58) Field of Classification Search
CPC ................ G06K 15/1857; G06K 15/1888
See application file for complete search history.

(56) References Cited

U.S. PATENT DOCUMENTS

| | | | |
|---|---|---|---|
| 6,441,919 B1 * | 8/2002 | Parker et al. ................. | 358/1.18 |
| 2009/0290797 A1 * | 11/2009 | Arakawa et al. .............. | 382/177 |
| 2010/0238177 A1 * | 9/2010 | Igarashi ........................ | 345/441 |
| 2011/0317205 A1 * | 12/2011 | Naito et al. ................... | 358/1.15 |

FOREIGN PATENT DOCUMENTS

JP 2009-172913 A 8/2009

* cited by examiner

*Primary Examiner* — Marivelisse Santiago Cordero
*Assistant Examiner* — Moustapha Diaby
(74) *Attorney, Agent, or Firm* — Canon USA, Inc., IP Division

(57) ABSTRACT

An image forming apparatus to generate image data of print data containing a drawing object for reuse within a job includes a cache unit, an object parallel processing unit, a page parallel processing unit, and a processing control unit. The cache unit generates data based on the drawing object and caches generated data. The object parallel processing unit divides each page of the print data per drawing object unit and subjects a divided page to raster image processor (RIP) processing in parallel. The page parallel processing unit subjects the print data to the RIP processing per page unit. The processing control unit controls such that, in the print data, the object parallel processing unit executes processing sequentially from an initial page until the data having a value equal to or more than a threshold value is cached and the page parallel processing unit executes processing after the data is cached.

20 Claims, 7 Drawing Sheets

IMAGE FORMING APPARATUS, METHOD FOR CONTROLLING IMAGE FORMING APPARATUS, AND STORAGE MEDIUM

BACKGROUND OF THE INVENTION

1. Field of the Invention

The present invention relates to an image forming apparatus, a method for controlling thereof, and a storage medium used therein.

2. Description of the Related Art

In association with the development of digital printing, variable data printing (hereinafter referred to as "VDP") featuring the digital printing has been drawing attention for a long time. A print method in which a part of a print product is changed as variable data per unit maximally exploits characteristics of a digital printer such as an electrophotography. In an early stage of the VDP, different VDP languages are used in different companies. However, Personalized Print Markup Language (PPML) is currently defined as a standard language as the VDP language and therefore the PPML is widely used now.

In the PPML, two objects such as a reusable object that is repetitively referred to and a local object that is referred to only once are exemplified as components for drawing a page. The reusable object is used in a case of placing a single drawing object at a plurality of places within a page, between pages, or between jobs. The drawing object, e.g., the local object and the reusable object, is normally described in the form of the PostScript (registered trademark; hereinafter referred to as "PS") and the Portable Document Format (PDF) as source drawing data. The above-described pieces of the source drawing data are subjected to raster image processor (RIP) processing to be formed into raster images and thereafter placed on a page.

In a case of the reusable object of the PPML that is surely reused, the raster image obtained by the RIP processing from the source drawing data is cached. As a result, a remarkably high speed drawing processing can be achieved. However, in a case where the raster image is a high resolution and high gradation color image, the raster image could be extremely large size. Therefore, a memory having a large capacity is required. To solve the above issue, there is a method in which a display list (i.e., intermediate data) immediately before converted into the raster image is generated from the source drawing data to cache it. It takes a time to render the display list but a memory capacity required for caching can be reduced remarkably. That is, the above-described method is a compromise plan in consideration with a balance between the memory capacity and performance.

On the other hand, development in clock performance in a central processing unit (CPU) that performs the RIP processing of the VDP has recently peaked, so that a multi-core technique in which a plurality of cores are packed together in a single package has advanced. To get great performance out of the multi-core CPU, parallelization of RIP processing is essential and thus some methods are discussed as a parallel processing method of PDL data including the VDP.

For example, there is a job parallel processing method in which a plurality of jobs are subjected to the RIP processing in parallel by a plurality of processor cores. In the job parallel processing method, an entire productivity can be improved in a case where a vast number of jobs are to be processed. However, when observing a single job among the vast number of jobs, a time required for the RIP processing is the same as a case where the job is processed by a single-core CPU. Therefore, the job parallel processing method is not considered as a suitable method for the VDP job that requires a shortened turnaround time.

There is another method, i.e., a page parallel processing method, in which a plurality of pages within a single job are subjected to the RIP processing in parallel by the plurality of cores. In the page parallel processing method, a high speed processing can be expected also with respect to the single job. However, an independent PDL language (VDP language) having no dependence relationship between pages is to be used. In addition, when observing only a single page in the job, a time required for the RIP processing is the same as a time required in the processing by a single processor core. The RIP processing of a page including a complex drawing often requires more time, which still may be a bottleneck also in the page parallel processing method.

There is further another method, i.e., an object parallel processing method, in which a plurality of drawing objects within a single page is subjected to the RIP processing in parallel by a plurality of processor cores. In the object parallel processing method, a time required in the RIP processing of the single page can be shortened. However, it is known that a calculation cost required in dividing and collecting the objects is high.

When considering an efficiency of the parallel processing, the job parallel processing method or the page parallel processing method is more desirable. Japanese Patent Application Laid-Open No. 2009-172913 discusses a record parallel processing method in which a job is divided per record defined by the VDP and the divided jobs are subjected to the RIP processing in parallel by a plurality of processor cores per record as an example of the parallel processing method specialized for the VDP. Manufacturing of a personalized print product for realizing One-to-One marketing exists as the purpose of the VDP. Generally, the VDP data for the single user is referred to as a record.

A high speed VDP using the parallel processing by the multi-core CPU is expected. However, a problem unique to the VDP exists. In the page parallel processing method, if a single reusable object is referred to concurrently in a plurality of pages to be subjected to the RIP processing, efficiency is down. This is because there is a requirement in subjecting a single reusable object to RIP processing redundantly by a plurality of processor cores or in waiting for a completion of the RIP processing of one of the processor cores. If the RIP processing is performed redundantly, effect of the cache processing of the reusable object as a large merit of the VDP is lost. On the other hand, if queue processing is performed, there is generated waste of CPU time due to the queue.

Typically, RIP processing of the reusable object occurs a lot near a head of the job and thus high speed processing becomes possible by the cache processing as the job develops. Therefore, it can be said that the page parallel processing method in the VDP is not good at handling the head of the job but is good at handling last half of the job.

The object parallel processing is considered as a method that can relatively go well with the VDP language such as PPML in which the local object and the reusable object are explicitly defined. This is because a calculation cost required for the division and the collection of the objects can be relatively kept low.

The reuse of the object is often performed between jobs, between records, or between pages but seldom performed within a page. Since the division of the object depends on a VDP application that generates the VDP data, effect cannot be expected in VDP data in which a page is composed of less number of objects. Further, since the reuse of the reusable object that is cached as the development of the job increases, the number of objects to be subjected to the parallel processing decreases. In other words, the object parallel processing method in the VDP is good at handling the head of the job but is not good at handling rather in the last half of the job.

As described above, there is a circumstance unique to the VDP in the parallel processing method of the RIP in the VDP. Therefore, there are good points and bad points independent from which processing method is selected.

SUMMARY OF THE INVENTION

The present invention is directed to an image forming apparatus capable of improving a RIP processing speed of VDP by utilizing the respective merits of two methods such as page parallel processing and object parallel processing in parallel processing using the multi-core CPU.

According to an aspect of the present invention, an image forming apparatus capable of generating image data of print data containing a drawing object to be reused within a job includes a cache unit configured to generate data based on the drawing object to be reused and cache the generated data based on the drawing object, an object parallel processing unit configured to divide each page of the print data per drawing object unit and to subject a divided page to raster image processor (RIP) processing in parallel, a page parallel processing unit configured to subject the print data to the RIP processing in parallel per page unit, and a processing control unit configured to control such that, in the print data, the object parallel processing unit executes processing sequentially from an initial page of the print data until the data based on the drawing data having a value equal to or more than a threshold value is cached and the page parallel processing unit executes the processing after the data based on the drawing data having the value equal to or more than the threshold value is cached.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
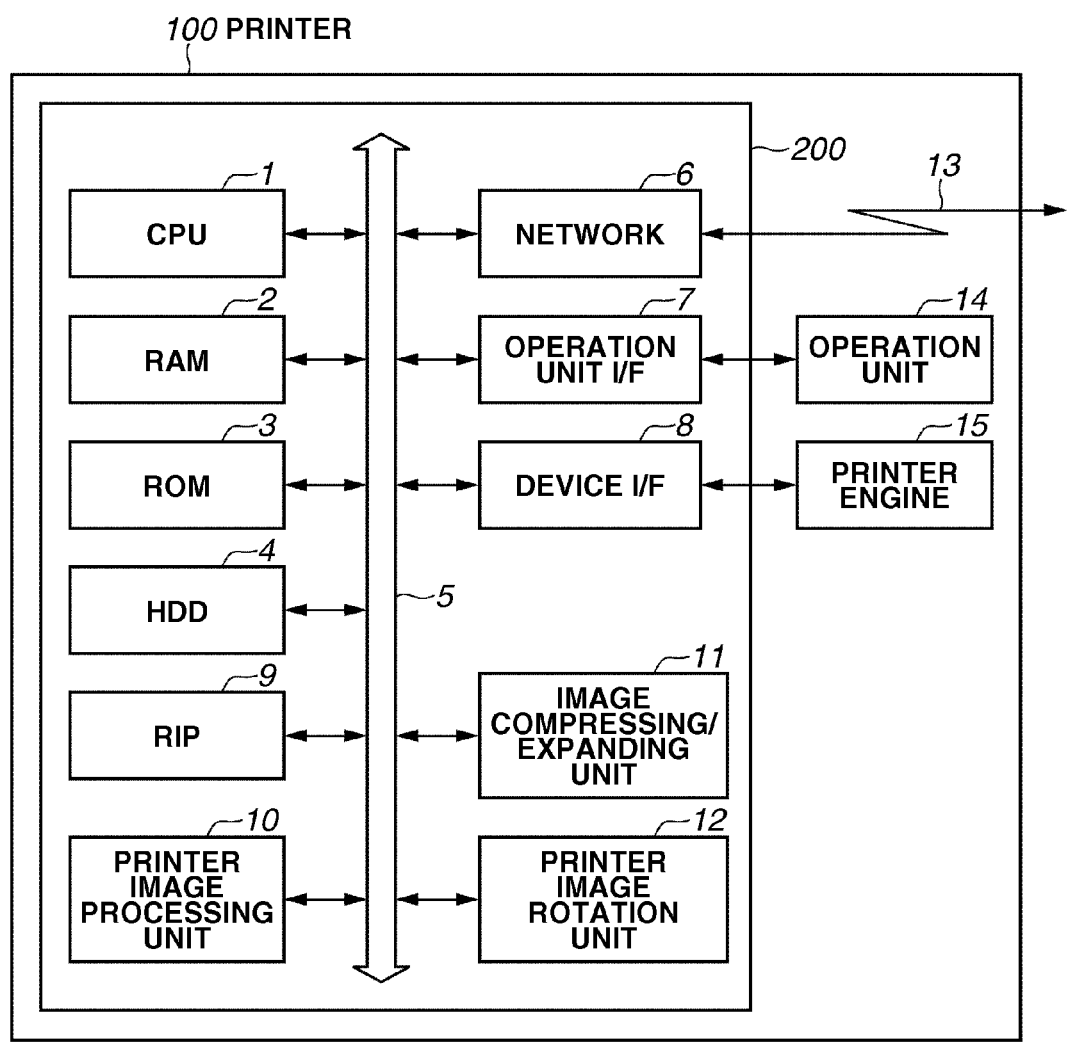
FIG. 1 is a hardware block diagram according to an exemplary embodiment.

FIG. 1 is a hardware block diagram illustrating a configuration of a printer 100 as an image forming apparatus which is applied as an exemplary embodiment. In the present exemplary embodiment, the description is made by using the configuration of a singular image forming apparatus. However, a configuration in which processes in a plurality of processes are separately executed on a host computer to which the image forming apparatus is connected via a network is also employable.

A controller unit 200 controls an input and output of image signals and device information. A Central Processing Unit (CPU) 1 reads out a program stored in a read only memory (ROM) 3 or a hard disk drive (HDD) 4 and loads the program to a random access memory (RAM) 2 to execute it. The CPU 1 comprehensively controls each device that is connected to a system bus 5. The CPU 1 is a dual-core processor that includes two cores and thus can execute two control programs simultaneously and in parallel.

The RAM 2 functions as a main memory as well as a work area of the CPU 1. The ROM 3 stores a boot program to be executed when the power is turned on. The HDD 4 stores an operating system and a control program main body of the present apparatus. The HDD 4 is also used for the purpose of storing a large capacity data such as image data or print data on a temporary or long-term basis. A network 6 is connected to a local area network 13 inputs and outputs the print data or the device information.

An operation unit interface (I/F) 7 is an interface unit connected to an operation unit 14 and outputs image data to be displayed on the operation unit 14 to the operation unit 14. The operation unit I/F 7 transmits information input by a user of the present apparatus via the operation unit 14 to the CPU 1. The operation unit 14 includes a liquid crystal panel and a sound source as output devices and includes a touch panel and hard keys as input devices.

The controller unit 200 is connected to a printer engine 15 via a device I/F 8. The device I/F 8 outputs image signals, instructs an operation of the device, and receives the device information based on an instruction of the CPU 1. The printer engine 15 is an output device that outputs the image signals from the controller unit 200 onto a medium. The printer engine 15 can employ either one of an electrophotographic method or an ink jet method.

A raster image processor (RIP) 9 is hardware dedicated to rasterizing a display list to a raster image. The RIP 9 processes the display list generated on the RAM 2 by the CPU 1 at high speed and in parallel with the execution of the CPU 1. A printer image processing unit 10 performs an image correction, a half toning, and the like on printout image data. A printer image rotation unit 12 rotates image data. An image compressing/expanding unit 11 performs compressing and expanding processing on multi-valued image data based on a Joint Photograph Experts Group (JPEG) format, and on binary image data based on a Joint Bi-level Image Experts Group (JBIG) format, a Modified Modified READ (MMR) format, or a Modified Huffman (MH) format.

Figure 2A:
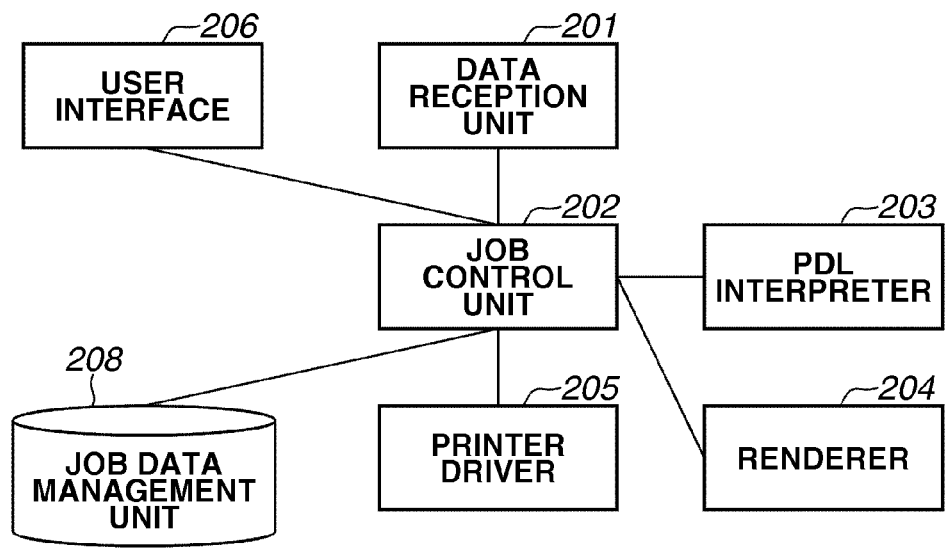
FIG. 2A is a software block diagram according to the exemplary embodiment.

FIG. 2A illustrates a configuration of software modules of the present image forming apparatus. Each software module illustrated in FIG. 2A is stored in the HDD 4 in the form of a program and loaded to the RAM 2 to be executed by the CPU 1. More specifically, each software module is loaded to the RAM 2 by the operating system (OS) running on the CPU 1 and provided with an execution right per thread unit to be executed.

A data reception unit 201 receives print data transmitted from the host computer and thus received print data is stored in a job data management unit 208 via a job control unit 202.

The job control unit 202 comprehensively controls all the jobs from data reception to printing.

A Page Description Language (PDL) interpreter 203 interprets print data and generates a display list as intermediate data. The generated display list is stored in the job data management unit 208 via the job control unit 202. A renderer 204 is a module that generates a bitmap image from the display list. A lot of processing is executed by the RIP 9 as a dedicated hardware.

The generated bitmap image is stored in the job data management unit 208 via the job control unit 202. The printer driver 205 outputs a print instruction and the bitmap image to the printer engine 15 via the device I/F 8.

A user interface 206 is a module that controls the operation unit 14 via the operation unit I/F 7. Mainly, the user interface 206 generates data to be displayed on the liquid crystal panel of the operation unit 14 and updates the display of the liquid crystal panel according to an input via the touch panel. In a case where the input via the touch panel indicates a job execution instruction, the user interface 206 transmits the instruction to the job control unit 202. The job data management unit 208 is a database for storing and managing each of the print data, the display list, and the bitmap image on a temporary or long-term basis.

Figure 2B:
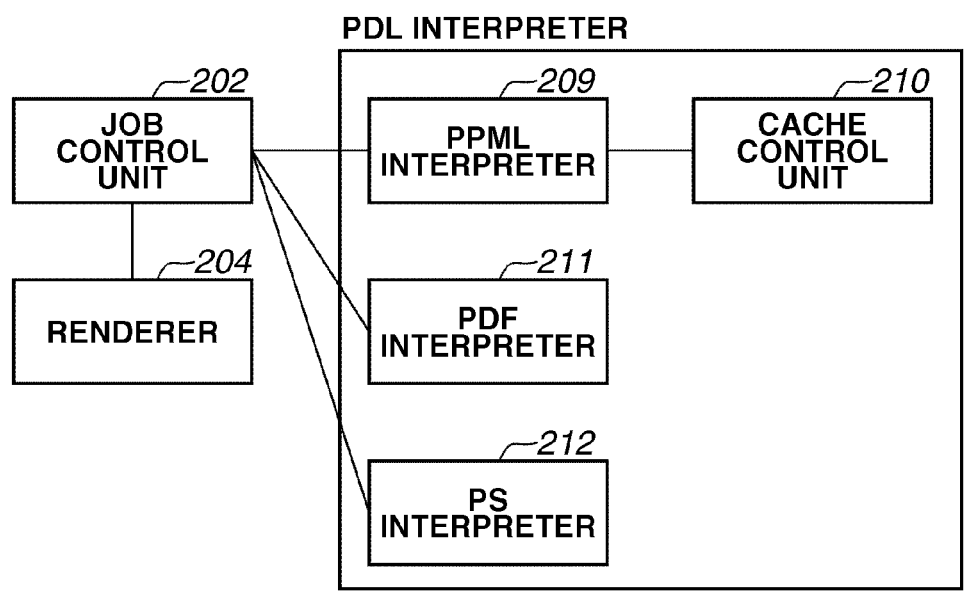
FIG. 2B is a software block diagram illustrating a detail of a PDL interpreter of FIG. 2A.

FIG. 2B illustrates a configuration of software modules of the PDL interpreter 203 of FIG. 2A in more detail. A Personalized Print Markup Language (PPML) interpreter 209 interprets PPML data and generates a display list thereof. A Portable Document Format (PDF) interpreter 211 interprets PDF data and generates a display list thereof. A Post Script (PS) interpreter 212 interprets PS data and generates a display list thereof. A cache control unit 210 caches a drawing object in the form of the display list.

In a case where the PS data or the PDF data is designated as the PPML contents, the PPML interpreter 209 boots up the PDF interpreter 211 or the PS interpreter 212 via the job control unit 202. In a case where the PPML data instructs reuse of the drawing object, the PPML interpreter 209 reuses the drawing object in conjunction with the cache control unit 210.

Figures 3, 3A, 3B:
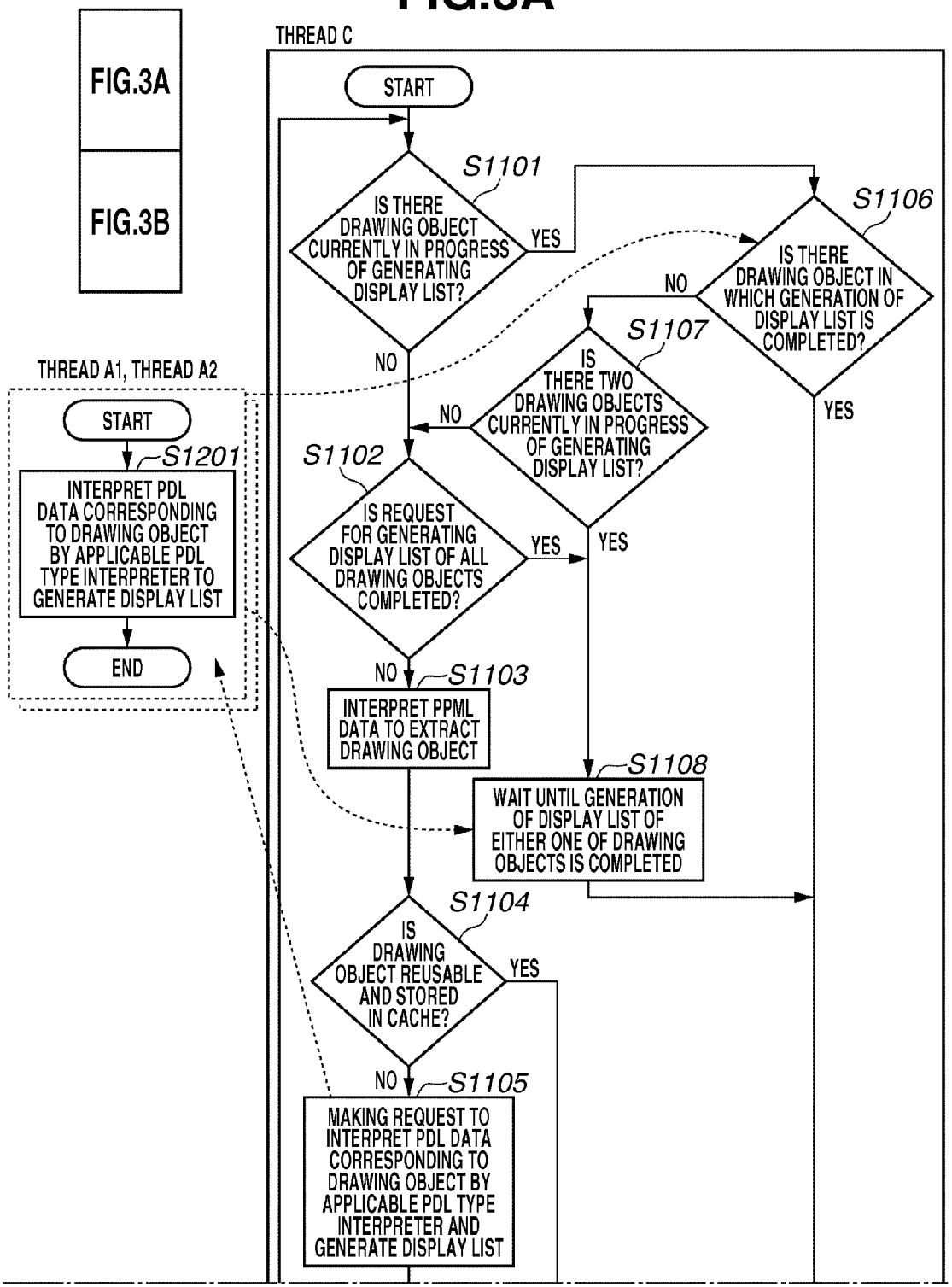
FIG. 3 (including FIGS. 3A and 3B) is a flow chart of object parallel processing in a PPML.
Figure 3B:
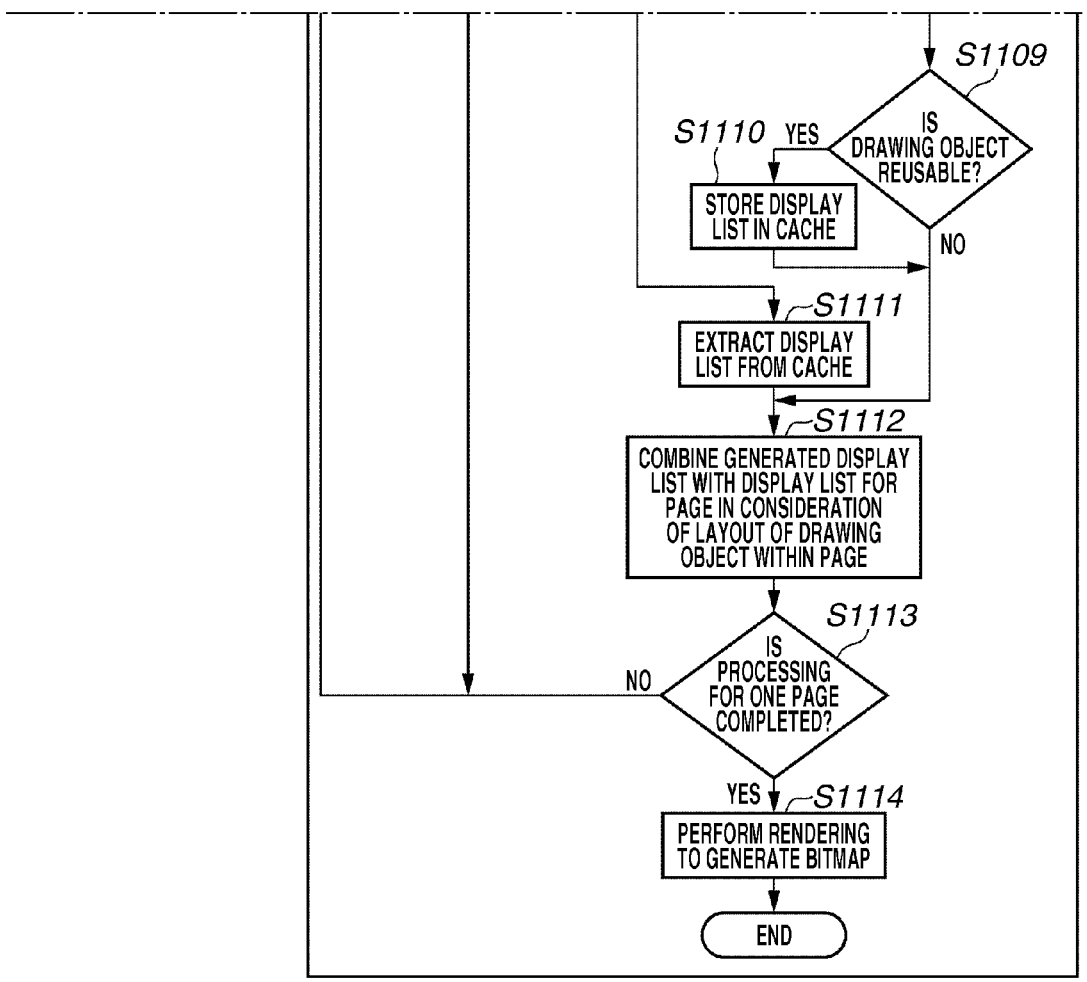

FIG. 3 (including FIGS. 3A and 3B) is a flow chart illustrating a control flow of RIP processing per object unit, that is RIP processing to be performed on the PPML data corresponding to one page in a case where object parallel processing is performed. In the present description, the RIP processing is executed by each software module illustrated in FIG. 2A and FIG. 2B. The present flow chart is realized such that a program stored in each software module in FIG. 2A and FIG. 2B stored in the HDD 4 is read out and loaded to the RAM 2 to be executed by the CPU 1.

In the present flow chart, three threads, i.e., a thread A1, a thread A2, and a thread C, are parallelly executed. Each thread is time-divided by the operating system (OS) and assigned to two cores within the CPU 1 sequentially. Since each thread is time-divided into a satisfactory small unit, the three threads can be considered to be parallelly operated. However, concurrently executed are two threads when focusing at a specific point in time.

Since multi-threading processing performed by the operating system is a publicly widely known technique, a detailed description thereof is omitted here. The thread C is a main thread of the PPML processing and the thread A1 and the thread A2 are dynamically generated by the thread C upon execution of the PPML processing.

In step S1101, in the thread C, the PPML interpreter 209 initially determines whether there is a drawing object in process of generating a display list at the time. Since there is no drawing object in process of generation of the display list at the time of starting page processing, the result is NO.

If the determination result is NO (NO in step S1101), the processing proceeds to step S1102. In step S1102, the PPML interpreter 209 determines whether a request for generating the display list of all the drawing objects within the page is completed. As described below, the display list generation processing of the drawing objects is performed by requesting it to the other thread.

Since the request for generating the display list of all the drawing objects is not completed at the time of starting the page processing, the result is NO. If the determination result is NO (NO in step S1102), the processing proceeds to step S1103 where the PPML interpreter 209 interprets the PPML data and extracts the drawing object therefrom. The drawing object indicates either one of a local object or a reusable object defined with the PPML data.

Then, in step S1104, the PPML interpreter 209 determines whether the drawing object is the reusable object and is already stored in the cache. If the determination result is NO (NO in step S1104), the processing proceeds to step S1105. In step S1105, the PPML interpreter 209 notifies the job control unit 202 of the request for generating the display list of the PDL data corresponding to the drawing object. The job control unit 202 generates a new thread A and causes the PDL interpreter to execute generation of the display list.

In FIG. 3, two threads such as the thread A1 and the thread A2 are illustrated, however, the number of the threads dynamically generated is any number as far as it is corresponding to the number of the drawing objects. However, since it is so controlled that the number of the threads to be executed at the same time is limited to two as described below, the generated threads are represented by the thread A1 and the thread A2 for the convenience sake.

After the PPML interpreter 209 completes the processing in step S1105, the processing returns to step S1101.

In step S1104, if the determination result is YES, the processing proceeds to step S1111 where the PPML interpreter 209 extracts the display list having been cached via the cache control unit 210. The cache of the display list is not discarded between jobs and between pages, so that the cache may be hit even immediately after starting the page processing.

In step S1112, the PPML interpreter 209 combines the display list with the display list for the page in consideration with a layout of the drawing object within the page.

Then in step S1113, the PPML interpreter 209 determines whether the generation of the display list corresponding to one page is completed. If the determination result is NO (NO in step S1113), the processing returns to step S1101 and the PPML interpreter 209 repeats processing therefrom again.

In step S1101, if the determination result is YES, the processing proceeds to step S1106. In step S1101, the PPML interpreter 209 determines that the display list is in process of generation including also a case where the processing in step S1112 is not completed even when the generation of the display list is completed.

In step S1106, the PPML interpreter 209 determines whether there is a drawing object of which display list is completely generated. Since the processing for generating the display lists of the thread A1 and the thread A2 are executed asynchronously and prallelly, both cases can be predicted. If the determination result is NO (NO in step S1106), the processing proceeds to step S1107 where the PPML interpreter 209 determines whether there are two drawing objects of which display lists are in process of generation at the time.

In step S1107, if the determination result is NO, the processing proceeds to step S1102, whereas, if the determination result is YES, the processing proceeds to step S1108.

In step S1108, the PPML interpreter 209 waits until the generation of the display list of either one of the drawing objects is completed. When the synchronous control is performed on the thread A1 or the thread A2 and the processing of the thread A1 or the thread A2 is completed, the processing proceeds to step S1109.

In step S1107, a determination value of the number of the drawing objects is set to two because the apparatus includes two CPU cores. In an exemplary embodiment including more CPU cores, the determination value may be changed according to the number of CPU cores.

In step S1106, if the determination result is YES, the processing proceeds to step S1109. In step S1109, the PPML interpreter 209 determines whether the drawing object is the reusable object.

If the determination result is YES (YES in step S1109), the processing proceeds to step S1110 where the PPML interpreter 209 stores the generated display list in the cache via the cache control unit 210. Then, the processing proceeds to step S1112. In step S1109, if the determination result is NO, the processing also proceeds to step S1112.

In step S1102, if the determination result is YES, the processing proceeds to step S1108. The control flow is generated when the request for generating the display lists of all the drawing objects is completed and the thread A1 or the thread A2 is placed in a standby state.

In step S1113, if the determination result is YES, the processing proceeds to step S1114 where the PPML interpreter 209 performs rendering to generate a bitmap.

In step S1201 of the thread A1 and the thread A2, the PS interpreter 212 or the PDF interpreter 211 interprets PDL data corresponding to the drawing object. The PS interpreter 212 or the PDF interpreter 211 generates a display list corresponding to the drawing object. Accordingly, the RIP processing is performed per drawing object unit.

The PS interpreter 212 or the PDF interpreter 211 has a reentrant configuration and can process two pieces of PS data or two pieces of PDF data at the same time. Processing times of the thread A1 and the thread A2 largely depend on an amount and complexity of the PDL data to be interpreted, so that end timing cannot be predicted in advance.

Figure 4:
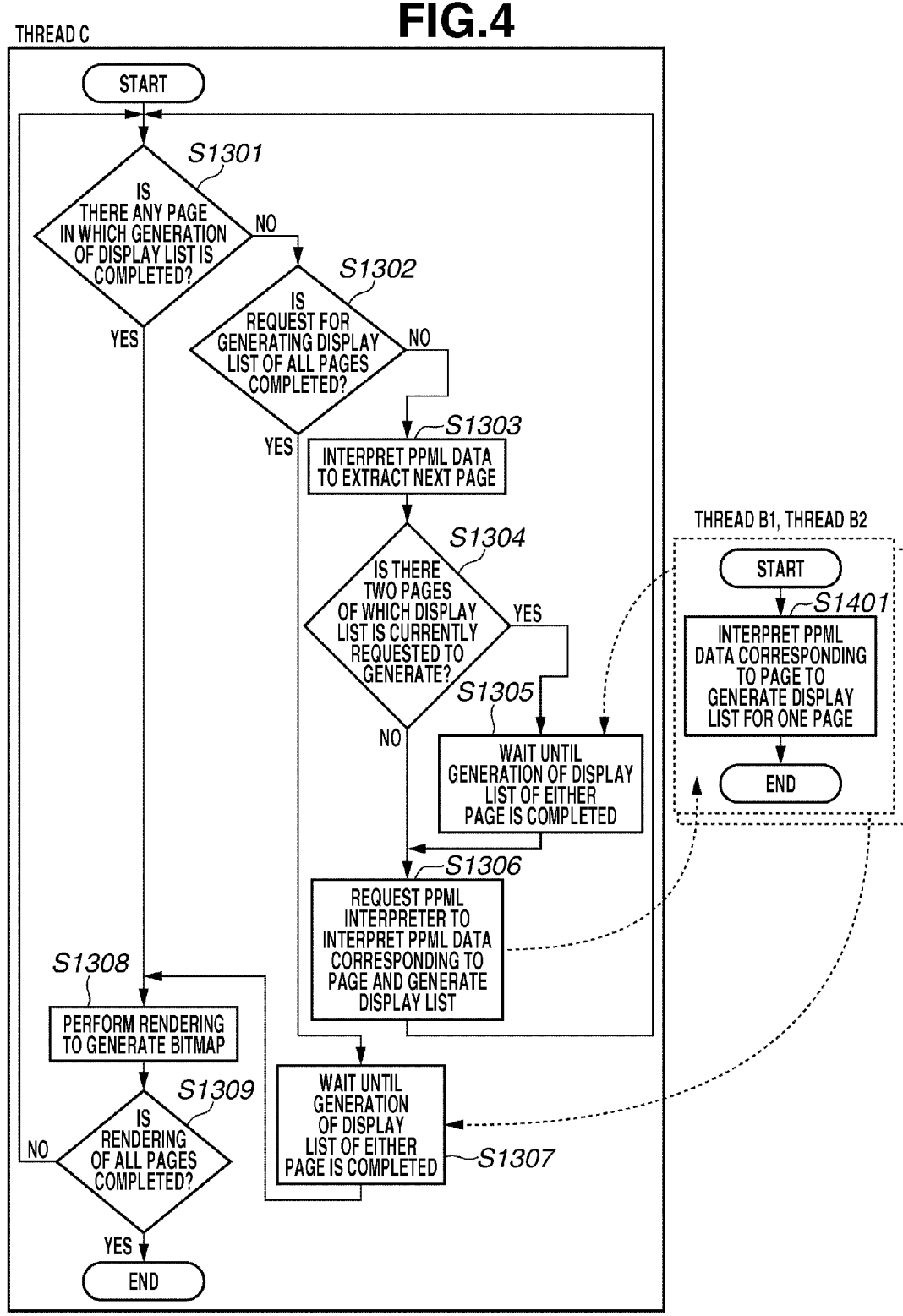
FIG. 4 is a flow chart of page parallel processing in the PPML.

FIG. 4 is a flow chart illustrating a control flow of the RIP processing per page unit in which the RIP processing is performed on the PPML data subjected to page parallel processing. In the present description, the RIP processing is executed by each software module illustrated in FIG. 2A and FIG. 2B. The present flow chart is realized such that a program stored in each software module in FIG. 2A and FIG. 2B stored in the HDD 4 is read out and loaded to the RAM 2 to be executed by the CPU 1.

In the present flow chart, three threads such as a thread B1, a thread B2, and the thread C are executed in parallel. Each thread is time-divided by the operating system (OS) and assigned to two cores within the CPU 1 sequentially. Since each thread is time-divided into a satisfactory small unit, the three threads can be considered to be parallelly operated. However, concurrently executed are two threads when focusing at a specific point in time.

The multi-threading processing performed by the operating system is a publicly widely known technique, so that the detailed description thereof is omitted here. The thread C is the main thread of the PPML processing and the thread B1 and the thread B2 are dynamically generated by the thread C upon execution of the PPML processing.

In step S1301, in the tread C, the PPML interpreter 209 initially determines whether there is a page in which the generation of the display list is completed. Since the generation of the display list is not completed at the time of starting the processing in the flow chart in FIG. 4, the determination result is NO.

If the determination result is NO (NO in step S1301), the processing proceeds to step S1302 where the PPML interpreter 209 determines whether a request for generating the display lists of all the pages is completed. As described below, the processing for generating the display list of each page is performed by requesting it to the other thread.

Since the request for generating the display lists of all the pages is not completed at the time of starting the processing in the flow chart in FIG. 4, the result is NO. If the determination result is NO (NO in step S1302), the processing proceeds to step S1303 where the PPML interpreter 209 interprets the PPML data to extract the next page.

Then in step S1304, the PPML interpreter 209 determines whether there are two pages in process of requesting the generation of the display lists at the time. If the determination result is NO (NO in step S1304), the processing proceeds to step S1306. In step S1306, the PPML interpreter 209 notifies the job control unit 202 of the request of the generation of the display list of the PPML data corresponding to the page. The job control unit 202 generates a new thread B to cause the PPML interpreter 209 to execute the generation of the display list.

In step S1304, if the determination result is YES, the processing proceeds to step S1305 where the PPML interpreter 209 waits until the processing of generating the display list of either one of the pages is completed. In FIG. 4, two threads such as the thread B1 and the thread B2 are illustrated, however, the number of the threads dynamically generated corresponds to the number of pages. However, since the number of threads which are simultaneously executed under the control of the processing in step S1304 and step S1305 is limited to two, the threads are indicated as the thread B1 and the thread B2 here for the convenience sake.

In step S1305, synchronous control is performed on either one of the thread B1 or the thread B2, and, when the processing of the thread B1 or the thread B2 is completed, the processing proceeds to the next step S1306.

In step S1304, the determination value of the number of pages is set to two, because the CPU 1 includes two CPU cores. In an exemplary embodiment including more CPU cores, the determination value may be changed according to the number of CPU cores. When the processing in step S1306 is ended, the processing returns to step S1301, and the PPML interpreter 209 repeats the processing therefrom again.

In step S1301, if the determination result is YES, the processing proceeds to step S1308 where the PPML interpreter 209 performs rendering and generates the bitmap.

Subsequently, the processing proceeds to step S1309 where the PPML interpreter 209 determines whether the rendering is completed with respect to all the pages. If the determination result is YES (YES in step 1309), the processing in the flow chart in FIG. 4 is ended. If the determination result is NO (NO in step S1309), the processing returns to step S1301, and the PPML interpreter 209 repeats the processing therefrom again.

In step S1302, if the determination result is YES, the processing proceeds to step S1307 where the PPML interpreter 209 waits until the generation of the display list of either one of the pages is completed. The control flow is generated when the request for generating the display lists of all the pages is completed and the thread B1 or the thread B2 is placed in a standby state.

In step S1401 of the thread B1 and the thread B2, the PPML interpreter 209 interprets the PDL data corresponding to the drawing object to generate the display list thereof. The display list generation processing of the PPML interpreter 209 is configured to be reentrant and two pieces of PPML data can be processed at the same time.

Since processing time of the thread B1 and the thread B2 largely depends on an amount and complexity of the PDL data (e.g., PPML data and PS data, or PDF data) to be interpreted, timing to end the processing cannot be preliminary predicted.

Figure 5:
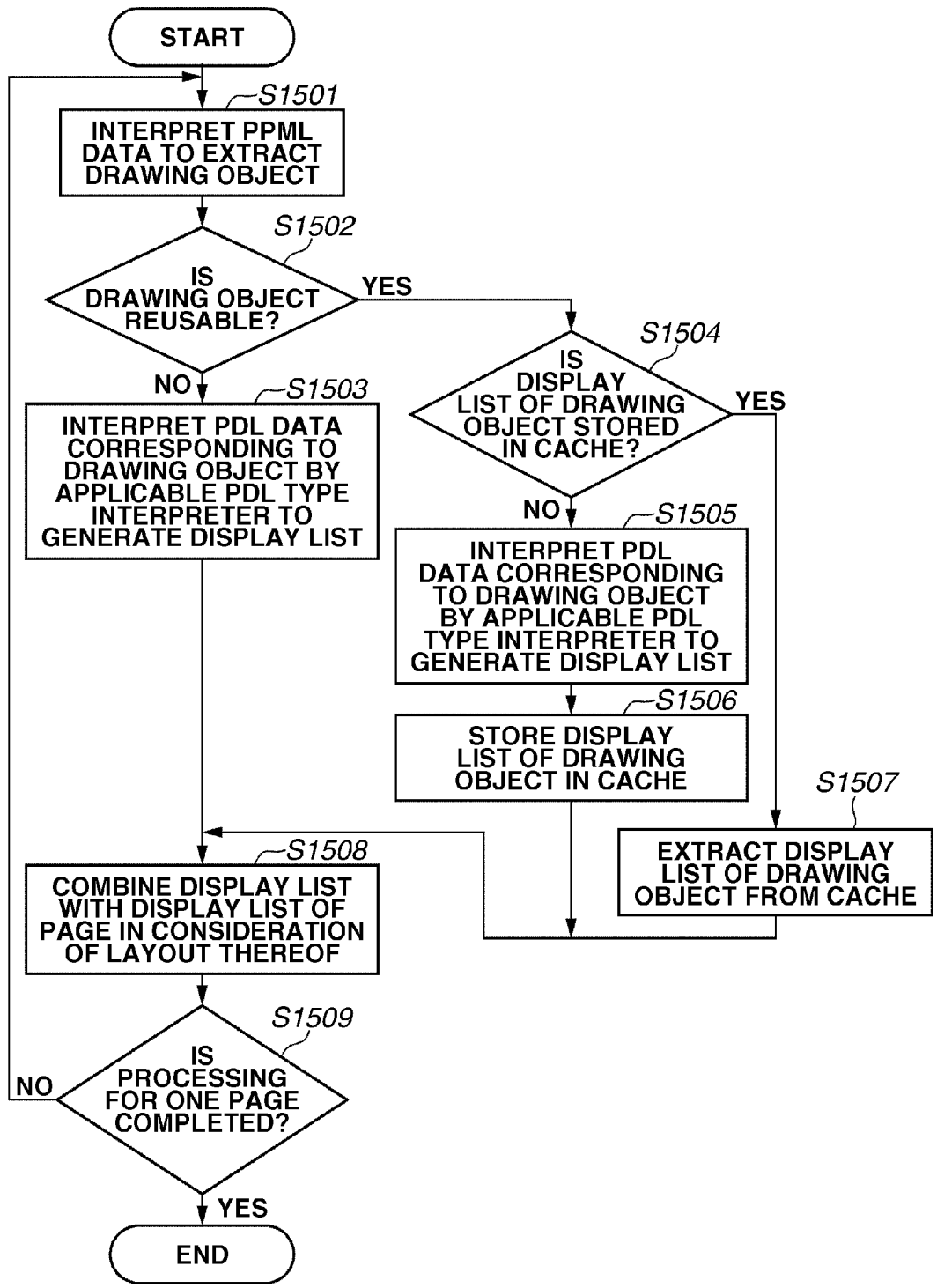
FIG. 5 is a flow chart of display list generation processing during page parallel processing.

FIG. 5 illustrates the display list generation processing of each page during the page parallel processing. Especially, FIG. 5 illustrates step S1401 in FIG. 4 in detail. In the present description, the RIP processing is executed by each software module illustrated in FIG. 2A and FIG. 2B. The present flow chart is realized such that a program stored in each software module in FIG. 2A and FIG. 2B stored in the HDD 4 is read out and loaded to the RAM 2 to be executed by the CPU 1.

In step S1501, the PPML interpreter 209 initially interprets the PPML data to extract the drawing object thereof. The drawing object indicates either one of a local object or a reusable object defined with the PPML data.

In step S1502, the PPML interpreter 209 determines whether the drawing object is the reusable object.

If the determination result is NO (NO in step S1502), the processing proceeds to step S1503 where the PPML interpreter 209 requests to the job control unit 202 for the display list generation processing of the PDL data corresponding to the drawing object. The job control unit 202 causes the PS interpreter 212 or the PDF interpreter 211 to execute the display list generation processing according to the PDL type. The PS interpreter 212 or the PDF interpreter 211 interprets the PDL data corresponding to the drawing object. Subsequently, the PS interpreter 212 or the PDF interpreter 211 generates a display list corresponding to the drawing object.

In step S1502, if the determination result is YES, the processing proceeds to step S1504 where the PPML interpreter 209 determines whether the display list of the drawing object is already stored in the cache. If the determination result is YES (YES in step S1504), the processing proceeds to step S1507 where the PPML interpreter 209 extracts the display list of the drawing object from the cache via the cache control unit 210. In step S1504, if the determination result is NO, the processing proceeds to step S1505.

In step S1505, the PPML interpreter 209, the job control unit 202, the PS interpreter 212, and the PDF interpreter 211 mutually cooperate with each other to generate the display list corresponding to the drawing object. The processing in step S1505 is identical to the processing in step S1503.

Then in step S1506, the PPML interpreter 209 stores the display list of the drawing object in the cache via the cache control unit 210.

When the processing in each of step S1503, step S1506, and step S1507 is ended, the processing in each step proceeds to step S1508. In step S1508, the PPML interpreter 209 combines the display list with the display list for a page in consideration with a layout of the drawing object within the page.

In step S1509, the PPML interpreter 209 determines whether the processing corresponding to one page is completed. If the determination result is YES (YES in step S1509), the processing in the flow chart in FIG. 5 is ended. If the determination result is NO (NO in step S1509), the processing returns to step S1501, and the PPML interpreter 209 repeats the processing therefrom again.

Figure 6:
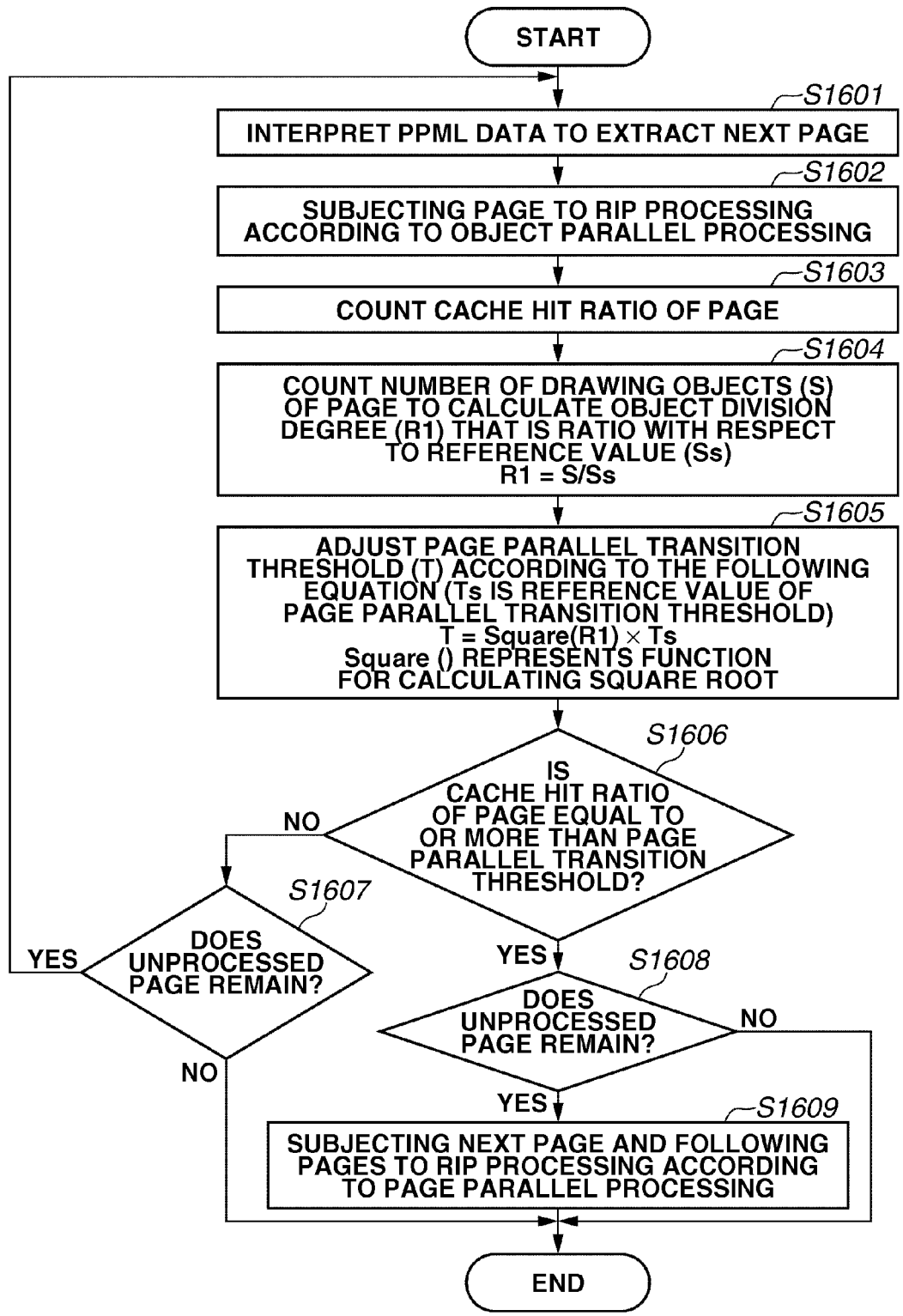
FIG. 6 is a flow chart of hybrid parallel processing in the PPML.

FIG. 6 is a flow chart illustrating a hybrid parallel processing in which the object parallel processing is combined with the page parallel processing in the PPML processing. In the present description, the RIP processing is executed by each software module illustrated in FIG. 2A and FIG. 2B. The present flow chart is realized such that a program stored in each software module in FIG. 2A and FIG. 2B stored in the HDD 4 is read out and loaded to the RAM 2 to be executed by the CPU 1.

In step S1601, the PPML interpreter 209 interprets the PPML data and extracts the next page. Then in step S1602, the PPML interpreter 209 subjects the page to the RIP processing according to the object parallel processing. The details in step S1602 corresponds to the flow chart illustrated in FIG. 3.

In step S1603, the PPML interpreter 209 counts a cache hit ratio of a reusable object included in the page. The cache hit ratio indicates a ratio of the reusable object after the display list is generated and cached among the reusable objects used in the page. For example, if ten reusable objects are included in a page and six reusable objects are already cached upon RIP processing of the page, the cache hit ratio is 0.6 (i.e., 60%).

Then in step S1604, the PPML interpreter 209 counts the number of drawing objects of the page to calculate an object division degree according to the following equation.

$$R1 = S/Ss$$

(R1: object division degree, S: number of drawing object of the page, Ss: reference value Ss)

The number of the drawing objects is the sum of the number of the local objects and the number of the reusable objects defined with the page. More specifically, the object division degree is a reference degree indicating whether the number of the objects in the page is large or small. To what degree the drawing object defined on the PPML data is divided largely depends on the VDP application that generates the PPML data.

The processing proceeds to step S1605 where the PPML interpreter 209 adjusts a page parallel transition threshold value according to the following equation.

$$T = \text{Square}(R1) \times Ts$$

(T: page parallel transition threshold value, R1: object division degree, Ts: reference value of page parallel transition threshold value, Square ( ): function for calculating square root)

According to the equation, the page parallel transition threshold value is adjusted such that the value thereof becomes larger in data containing the more number of drawing objects. On the other hand, the page parallel transition threshold value is adjusted such that the value thereof becomes smaller in data containing the less number of drawing objects.

In step S1606, the PPML interpreter 209 determines whether the cache hit ratio of the page is equal to or more than the page parallel transition threshold value. If the determination result is NO (NO in step S1606), i.e., if the cache hit ratio is less is less than the page parallel transition threshold value, the processing proceeds to step S1607. In step S1607, the PPML interpreter 209 determines whether there remains an unprocessed page.

If the determination result is NO (NO in step S1607), the processing in the flow chart in FIG. 6 is ended. If the determination result is YES (YES in step S1607), the processing returns to step S1601, and the PPML interpreter 209 repeats the object parallel processing therefrom again. According to the adjustment of the threshold value in step S1605, possibility increases in repeating the object parallel processing in the data containing more number of drawing objects. To the contrary, possibility increases in giving up the object parallel processing in an early stage in the data containing less number of drawing objects. This is because data containing more number of drawing objects per page is suitable to be subjected to the parallel processing and thus merits of the object parallel processing can be enjoyed.

In step S1606, if the determination result is YES, the processing proceeds to step S1608 where the PPML interpreter 209 determines whether there remains an unprocessed page.

If the determination result is NO (NO in step S1608), the processing in the flow chart in FIG. 6 is ended. If the determination result is YES (YES in step S1608), the processing proceeds to step S1609 where the PPML interpreter 209 subjects the next page and the following pages to the RIP processing according to the page parallel processing. The details in step S1609 correspond to the flow chart illustrated in FIG. 4.

As described above, in the hybrid parallel processing according to the present exemplary embodiment, the object parallel processing is executed from the first page while the cache hit ratio of the reusable object is low, whereas the processing is shifted to the page parallel processing as the cache hit ratio becomes higher. In other words, in the hybrid parallel processing, effective parallel processing having advantages of both of the object parallel processing and the page parallel processing can be achieved and the RIP performance of the VDP job can be more improved.

According to the embodiments, in the parallel processing using the multi-core CPU, the RIP processing speed of the VDP can be more improved by utilizing the merits of each of the two methods such as the page parallel processing and the object parallel processing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-036058 filed Feb. 22, 2011, which is hereby incorporated by reference herein in its entirety.

What is claimed is:

1. An image forming apparatus capable of generating image data of print data containing a drawing object to be reused within a job, the image forming apparatus comprising:
a processor coupled to a memory;
an object parallel processing unit configured to execute object raster image processor (RIP) processing in parallel per drawing object unit;
a page parallel processing unit configured to execute page RIP processing in parallel per page unit;
a cache unit configured to generate receive generated drawing object data that was generated based on numeric quantity of the drawing object and cache the generated drawing object data based on the drawing object;
an obtaining unit configured to obtain a ratio of a cached drawing object based on cached drawing object, generated based on numeric quantity of the drawing object, and the drawing object which is used in a page; and
a determination unit configured to determine whether the ratio of the drawing object which is used in a page and cached drawing object data exceeds a threshold,
wherein, when the determination unit determines that the ratio does not exceed the threshold, the object parallel processing unit executes the object RIP processing, and, after the object parallel processing unit executes the object RIP processing, the determination unit determines whether the ratio exceeds the threshold,
wherein, when the determination unit determines that the ratio exceeds the threshold, the page parallel processing unit executes the page RIP processing, and
wherein at least the object parallel processing unit, the page parallel processing unit, the cache unit, the obtaining unit, and the determination unit are implemented by the processor in the image forming apparatus.

2. The image forming apparatus according to claim 1, wherein the print data is Personalized Print Markup Language (PPML) data.

3. The image forming apparatus according to claim 1, further comprising an adjustment unit configured to adjust the threshold serving as a reference value for starting the page parallel processing according to a number of objects per page in the print data.

4. The image forming apparatus according to claim 3, wherein, as the number of objects per page in the print data becomes more, the adjustment unit adjusts the threshold serving as the reference value for starting the page parallel processing to be a larger value, and, wherein, as the number of objects per page in the print data becomes less, the adjustment unit adjusts the threshold serving as the reference value for starting the page parallel processing to be a smaller value.

5. The image forming apparatus according to claim 1, wherein the ratio is obtained based on a ratio of a number of cached objects compared to a number objects included in a page.

6. The image forming apparatus according to claim 1, wherein the object parallel processing unit executes the object RIP processing from a first page of the job.

7. The image forming apparatus according to claim 1, wherein each cached drawing object has been cached after RIP processing of a page.

8. The image forming apparatus according to claim 1, wherein the determination unit adjust the threshold such that the threshold becomes larger than a prior threshold for data containing a first number of drawing objects and becomes smaller for data containing a second number of drawing objects that is less than the first number of drawing objects.

9. A method for controlling an image forming apparatus capable of generating image data of print data containing a drawing object to be reused within a job, wherein the image forming apparatus includes an object parallel processing unit configured to execute object raster image processor (RIP) processing in parallel per drawing object unit, and a page parallel processing unit configured to execute page RIP processing in parallel per page unit, the method comprising:

receiving generated drawing object data that was generated based on numeric quantity of the drawing object and caching the generated drawing object data;

obtaining a ratio of a cached drawing object based on cached drawing object data, generated based on numeric quantity of the drawing object, and the drawing object which is used in a page; and determining whether the ratio of the drawing object which is used in a page and cached drawing object data exceeds a threshold, wherein, when it is determined that the ratio does not exceed the threshold, the object parallel processing unit executes the object RIP processing, and, after the object parallel processing unit executes the object RIP processing, determining includes determining whether the ratio exceeds the threshold, and wherein, when it is determined that the ratio exceeds the threshold, the page parallel processing unit executes the page RIP processing.

10. The method according to claim 9, wherein the print data is Personalized Print Markup Language (PPML) data.

11. The method according to claim 9, further comprising adjusting the threshold serving as a reference value for starting the page parallel processing according to a number of objects per page in the print data.

12. The method according to claim 9, wherein, as the number of objects per page in the print data becomes more, adjusting includes adjusting the threshold serving as the reference value for starting the page parallel processing to be a larger value, and, wherein, as the number of objects per page in the print data becomes less, adjusting includes adjusting the threshold serving as the reference value for starting the page parallel processing to be a smaller value.

13. The method according to claim 9, wherein the ratio is obtained based on a ratio of a number of cached objects compared to a number objects included in a page.

14. The method according to claim 9, wherein the object parallel processing unit executes the object RIP processing from a first page of the job.

15. A non-transitory computer-readable medium storing a program to cause an image forming apparatus capable of generating image data of print data containing a drawing object to be reused within a job to perform a method, wherein the image forming apparatus includes an object parallel processing unit configured to execute object raster image processor (RIP) processing in parallel per drawing object unit, and a page parallel processing unit configured to execute page RIP processing in parallel per page unit, the method comprising:

receiving generated drawing object data that was generated based on numeric quantity of the drawing object and caching the generated drawing object data;

obtaining a ratio of a cached drawing object based on cached drawing object data, generated based on numeric quantity of the drawing object, and the drawing object which is used in a page; and determining whether the ratio of the drawing object which is used in a page and cached drawing object data exceeds a threshold, wherein, when it is determined that the ratio does not exceed the threshold, the object parallel processing unit executes the object RIP processing, and, after the object parallel processing unit executes the object RIP processing, determining includes determining whether the ratio exceeds the threshold, and wherein, when it is determined that the ratio exceeds the threshold, the page parallel processing unit executes the page RIP processing.

16. The non-transitory computer-readable medium according to claim 15, wherein the print data is Personalized Print Markup Language (PPML) data.

17. The non-transitory computer-readable medium according to claim 15, further comprising adjusting the threshold serving as a reference value for starting the page parallel processing according to a number of objects per page in the print data.

18. The non-transitory computer-readable medium according to claim 17, wherein, as the number of objects per page in the print data becomes more, adjusting includes adjusting the threshold serving as the reference value for starting the page parallel processing to be a larger value, and, wherein, as the number of objects per page in the print data becomes less, adjusting includes adjusting the threshold serving as the reference value for starting the page parallel processing to be a smaller value.

19. The non-transitory computer-readable medium according to claim 15, wherein the ratio is obtained based on a ratio of a number of cached objects compared to a number objects included in a page.

20. The non-transitory computer-readable medium according to claim 15, wherein the object parallel processing unit executes the object RIP processing from a first page of the job.

* * * * *